United States Patent
Yoon et al.

(10) Patent No.: US 6,495,283 B1
(45) Date of Patent: Dec. 17, 2002

(54) BATTERY WITH TRENCH STRUCTURE AND FABRICATION METHOD THEREOF

(75) Inventors: Young Soo Yoon, Kwachon (KR); Won Il Cho, Seoul (KR); Byung Won Cho, Seoul (KR); Hyung Jin Jung, Seoul (KR); Young Hwa Shin, Sungnam (KR)

(73) Assignee: Korea Institute of Science and Technology (KR)

( * ) Notice: Subject to any disclaimer, the term of this patent is extended or adjusted under 35 U.S.C. 154(b) by 0 days.

(21) Appl. No.: 09/502,613

(22) Filed: Feb. 11, 2000

(30) Foreign Application Priority Data

May 11, 1999 (KR) ............................................ 99-16770

(51) Int. Cl.[7] ..................... H01M 10/00; H01M 10/04; H01M 2/14
(52) U.S. Cl. ....................... 429/162; 429/247; 29/623.5
(58) Field of Search ................... 429/126, 127, 429/162, 247; 29/623.1, 623.5

(56) References Cited

U.S. PATENT DOCUMENTS

| | | | | |
|---|---|---|---|---|
| 4,996,128 A | * | 2/1991 | Aldecoa et al. | ............. 429/153 |
| 5,288,565 A | * | 2/1994 | Gruenstern | ................. 429/153 |
| 5,338,625 A | | 8/1994 | Bates et al. | ................. 429/322 |

* cited by examiner

*Primary Examiner*—Patrick Ryan
*Assistant Examiner*—Jonathan Crepeau
(74) *Attorney, Agent, or Firm*—Ostrolenk, Faber, Gerb & Soffen, LLP

(57) ABSTRACT

The present invention relates to a battery having a trench structure which can increase an effective area per unit area, and a fabrication method therefor. The battery according to the present invention forms trenches on thin film elements including a substrate, thereby increasing a contact interface between a cathode and an electrolyte and between the electrolyte and an anode, and simultaneously increasing an amount of an electrode per unit area. As a result, the present invention provides a high performance battery that a current density and a total current storage density are increased, and a charging speed after discharge is improved. The trench structure of the present invention can adapt to a bulk battery as well as a thin film battery.

20 Claims, 9 Drawing Sheets

BATTERY WITH TRENCH STRUCTURE AND FABRICATION METHOD THEREOF

BACKGROUND OF THE INVENTION

1. Field of the Invention

The present invention relates to a bulk battery or thin film battery, and a fabrication method thereof, and in particular to an improved battery which can increase an amount of an electrode and contact area between the electrode and an electrolyte per unit battery area by forming trenches on a substrate where a cathode is formed or on each thin film element sequentially formed on the substrate, and by increasing an effective area per unit area.

2. Description of the Background Art

Recently, a secondary battery has been studied as a power source of portable electric devices or microelectronic devices. As electric devices have become smaller, the size of the batteries have also become smaller, and the performance of the batteries have improved. It is expected that the secondary battery may extensively adapt to most kinds of the micro-electronic devices as well as light-weight mobile communication devices (for example, cellular phones) or portable computers. As the micro-electronic devices gradually consume less power, the conventional thin film battery structure (U.S. Pat. No. 5,338,625) may be adapted to various fields. According to a research result on secondary batteries, the battery has very stable operational properties and can be reduced in size. Also, it is possible to fabricate the battery in a small size by using a semiconductor process. The thin film battery which is one of the small size batteries is not restricted in shape or size. Therefore, when used as a power source for a device, the thin film battery can be fabricated in a comparatively small size, and thus can be adapted to the micro-electronic devices.

The performance of the battery is decided by current density, a total current storage density and a charging speed. When the thin film battery is applied to light-weight mobile communication devices, portable computers and micro-electromechanical systems requiring a comparatively high consumption power, the most difficult points are that the current density and the total current storage density are lowered due to a property of a thin film. Accordingly, in order to apply the light-weight thin film battery which can be fabricated in various shapes to devices having a comparatively high consumption power and current density, the total current storage density of the thin film battery must be increased. The total current storage density is decided by an amount of an electrode (cathode) and electrode materials used. The electrode materials which have been generally employed are $LiCoO_2$, $V_2O_2$, $LiMnO_2$ and $LiNiO_2$. Although each material has the total current storage density of a theoretical value, the completed thin film battery has a current storage density lower than the theoretical value. In order to increase an amount of the electrode to improve the total current storage density, in the case the electrode material is deposited thick, an internal resistance of the thin film battery is increased, and thus a voltage thereof is dropped. As a result, so as to increase the amount of the electrode, it is necessary to increase a contact area between the electrode and an anode per unit battery area.

FIG. 1 is a cross-sectional view illustrating a conventional thin film battery. As shown therein, a contact interface area among a first collector 1, a cathode 2 and an electrolyte 3 of the thin film battery is identical to an effective area of the battery. The amount of the electrode, namely the thickness of the cathode 2 is limited by an increase of the internal resistance. Therefore, the total current storage density also has a limited value. In addition, the charging speed is determined by the interface area among the first collector 1, the cathode 2, the electrolyte 3, the anode 4 and the second collector 6. Here, the collectors 1, 6 denote conductive materials.

SUMMARY OF THE INVENTION

Accordingly, it is an object of the present invention to provide a battery which has an improved performance by providing a trench structure to thin film elements, by increasing a size of an effective area per unit area of each thin film element, and by considerably increasing an amount of an electrode (cathode) and a contact area among a collector, an electrode and an electrolyte per unit battery area. The trench structure is adaptable to a bulk battery as well as the thin film battery.

In order to overcome disadvantages of the conventional art in a battery area and an interface area of each thin film element composing a battery, in accordance with the present invention, a trench structure is applied to a thin film battery consisting of a substrate, a first collector, a cathode, an electrolyte, an anode and a second collector. According to the present invention, the trenches are formed by etching the respective thin film elements which are sequentially stacked, namely the substrate, the first collector or the cathode. In addition, the trench structure can be applied to the bulk battery. In fabricating the thin film battery having the trench structure, a planarization process may performed after forming the anode, and a step of forming an encapsulation film on the anode may be further included.

BRIEF DESCRIPTION OF THE DRAWINGS

The present invention will become better understood with reference to the accompanying drawings which are given only by way of illustration and thus are not limitative of the present invention, wherein:

FIGS. 4a and 4b illustrate an arrangement of the trenches in accordance with the present invention, wherein:

FIG. 4a is a plan view illustrating single trenches which are formed on the substrate in one direction; and FIG. 4b is a cross-sectional view taken along line A—A of FIG. 4a;

FIGS. 5a to 5c show an arrangement of the trenches in accordance with the present invention, wherein:

FIG. 5a is a plan view illustrating double trenches which are formed on the substrate in both directions;

FIG. 5b is a cross-sectional view taken along line B—B of FIG. 5a; and

FIG. 5c is a cross-sectional view taken along line C—C of FIG. 5a;

FIGS. 9a and 9b show a state where the trenches in accordance with another embodiment of the present invention adapt to the bulk battery, wherein:

FIG. 9a is a cross-sectional view illustrating the bulk battery having the trenches; and FIG 9b is an enlarged view of portion D of FIG. 9a.

DETAILED DESCRIPTION OF THE PREFERRED EMBODIMENTS

The constitution and operation of a battery having a trench structure in accordance with preferred embodiments of the present invention will now be explained in detail with reference to the accompanying drawings.

Figure 2:
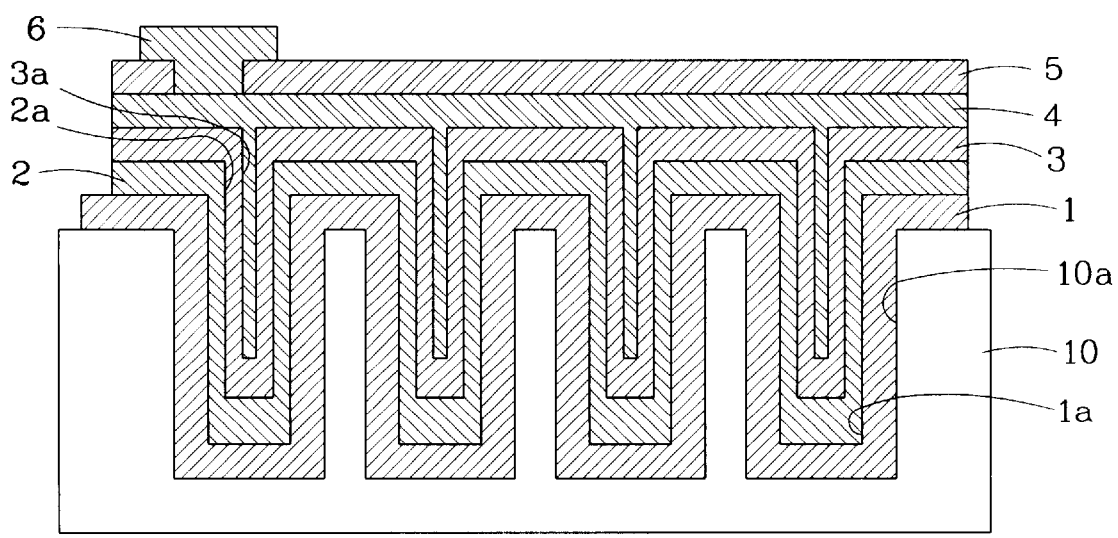
FIG. 2 is a cross-sectional view illustrating a thin film battery having a trench structure in accordance with a preferred embodiment of the present invention, wherein trenches are formed on a substrate.
Figure 3:
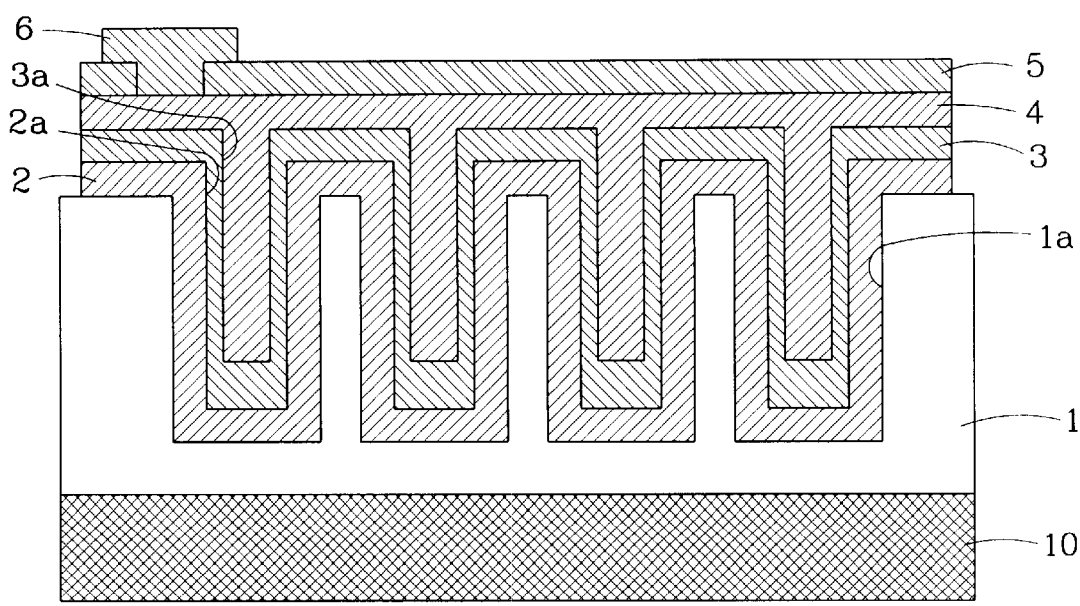
FIG. 3 is a cross-sectional view illustrating a thin film battery having a trench structure in accordance with another preferred embodiment of the present invention, wherein a first collector is deposited on a substrate, and trenches are formed on the first collector.

FIGS. 2 and 3 respectively show thin flim batteries having a trench structure in accordance with the embodiments of the present invention. As depicted FIG. 2, the thin flim battery includes: a substrate 10; a first collector 1 formed on the substrate 10; a cathode 2 formed on the first collector 1; and electrolyte 3 formed on the cathode 2; an anode 4 formed on the electrolyte 3; and a second collector 6 contacted with the anode 4. A plurality of trenches 10a having a predetermined width and depth are formed on the substrate 10 by etching an upper portion of the initial substrate 10 (on which nothing is deposited), and thus the trench structure is consecutively formed on the thin film elements which are sequentially stacked thereon.

A ceramic, a metal and a ploymer nay be used as the substrate 10. A chemical wet etching process or a vacuum dry etching process may be employed in order to fabricate the trenches in accordance with the present invention. Here, a size of the trench is defined in an aspect ratio. However, the size of the trench is not limited in the present invention. That is, the trenches in accordance with the present invention can have all aspect ratios which can increase the effective surface area. On the other hand, a shape of the trench is not limited to the shape as shown in FIG. 2. After forming the trenches, the thin film may be fabricated according to all thin film fabrication methods including a physical vapor deposition, a chemical vapor deposition, a sol-gel process or a metalorganic decomposition, etc.

As described above, when the collector 1 is deposited on the substrate 10 where the trenches 10a are formed, trenches 1a which are similar to the trenches 10a of the substrate 10 are formed on the collector 1. The collector 1 can increase the effective area as much as the collector portion to be formed along the internal surface of the trenches 10a. Thereafter, when the cathode 2 and the electrolyte 3 are formed, similar trenches 2a, 3a are formed, respectively, thereby increasing the effective contact interface area between the cathode 2 and the electrolyte 3, and the amount of the cathode 2.

On the other hand, according to the battery as shown in FIG. 3, the first collector 1 is formed on the substrate 10 of a thin film battery, and the trenches 1a are formed by etching the surface of the first collector 1. The other elements are identical to the embodiment of FIG. 2. The trenches 1a may be formed on the surface of the collector 1 in accordance with the chemical wet etching process or the vacuum dry etching process.

Differently from the embodiments of FIGS. 2 and 3, trenches 1a may be formed by forming the first collector 1 on the substrate 10, forming the cathode 2 on the first collector 1, and etching the cathode 2.

In accordance with the present invention, a planarization process may or may not be carried out after forming the anode 4. In addition, the second collector 6 may be formed on an encapsulation film 5 after forming the anode 4 and performing the encapsulation film process, or may be formed to be directly in contact with the anode without the encapsulation film process.

Figure 4A:
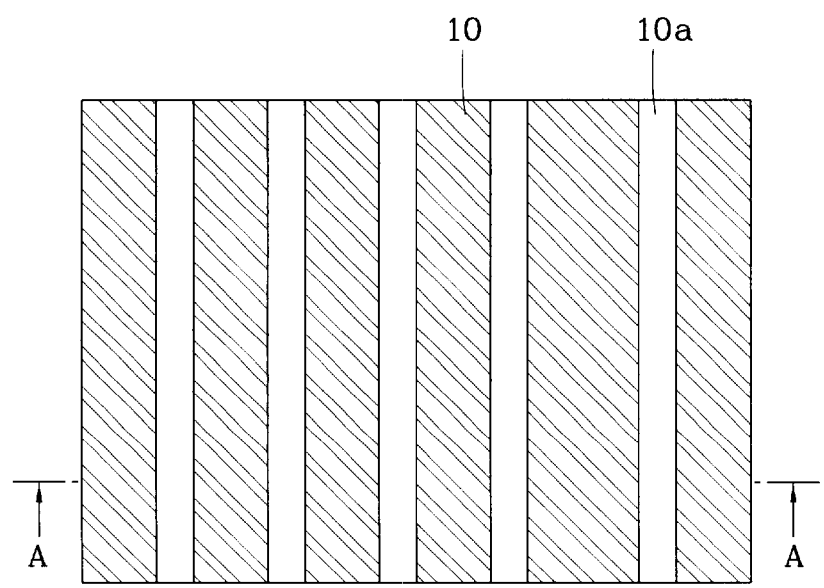
Figure 4B:
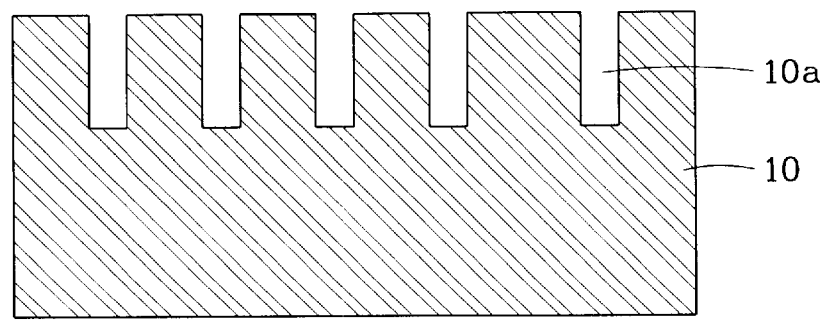
Figure 5A:
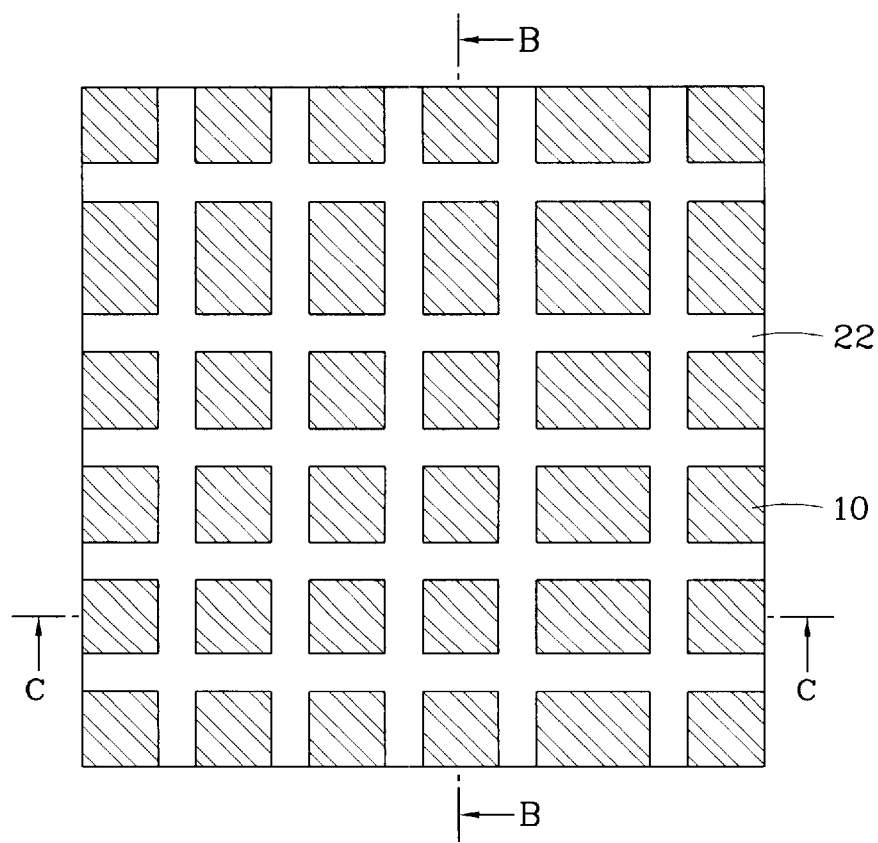
Figure 5B:
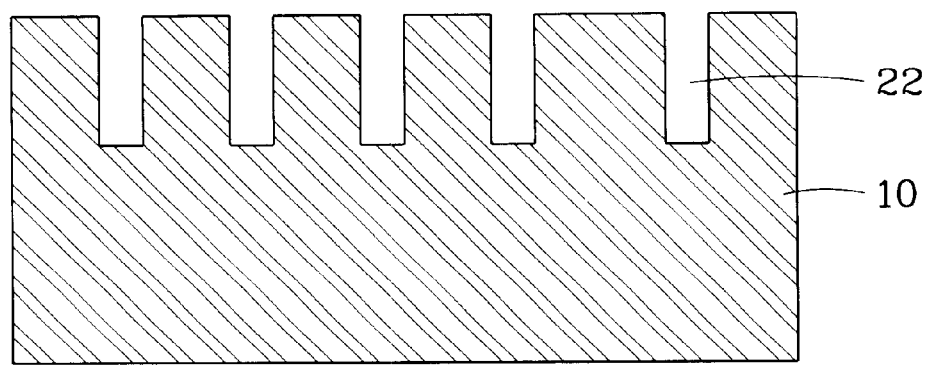
Figure 5C:
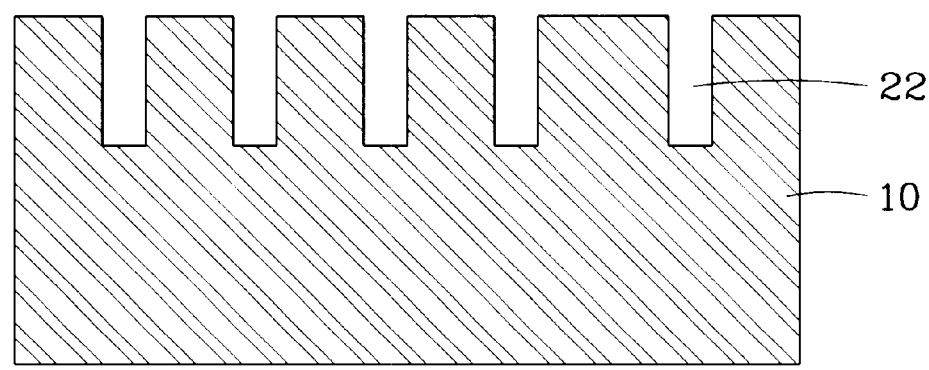
Figure 6A:
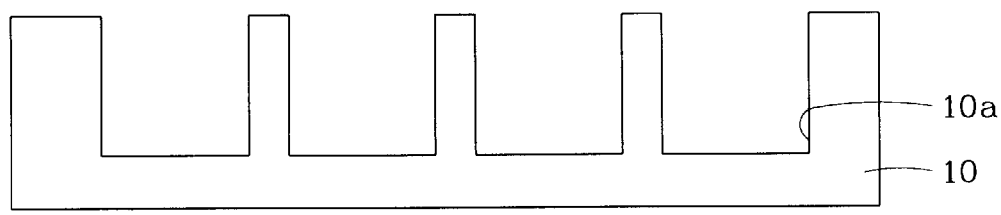
FIGS. 6a to 6f illustrate sequential steps of a fabrication process for the thin film battery having the trench structure in accordance with the present invention, wherein the trenches are formed on the substrate.
Figure 6B:
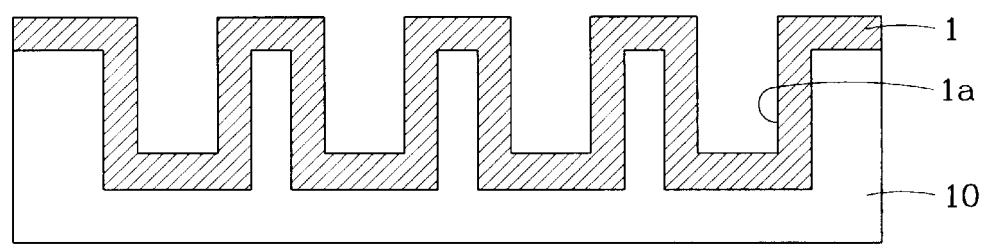
Figure 6C:
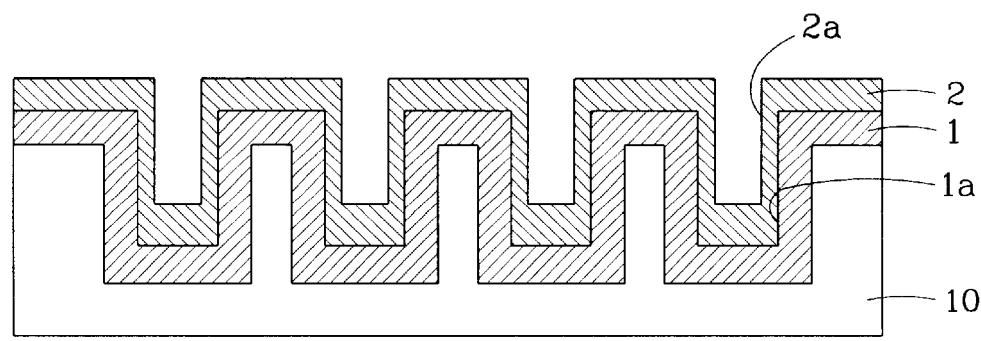
Figure 6D:
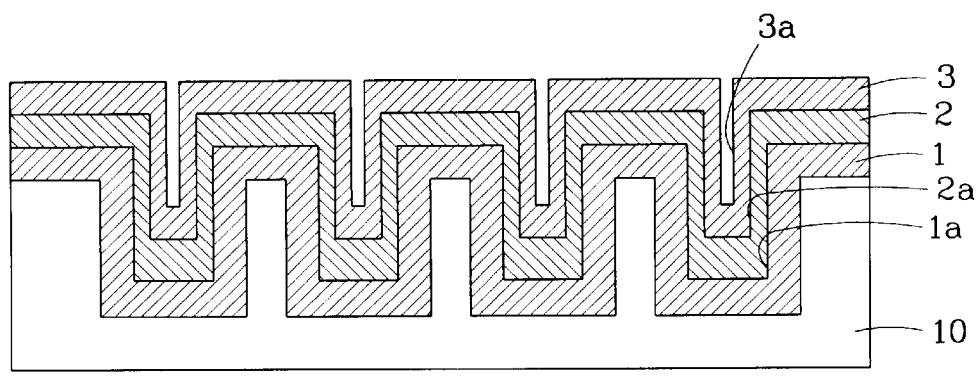
Figure 6E:
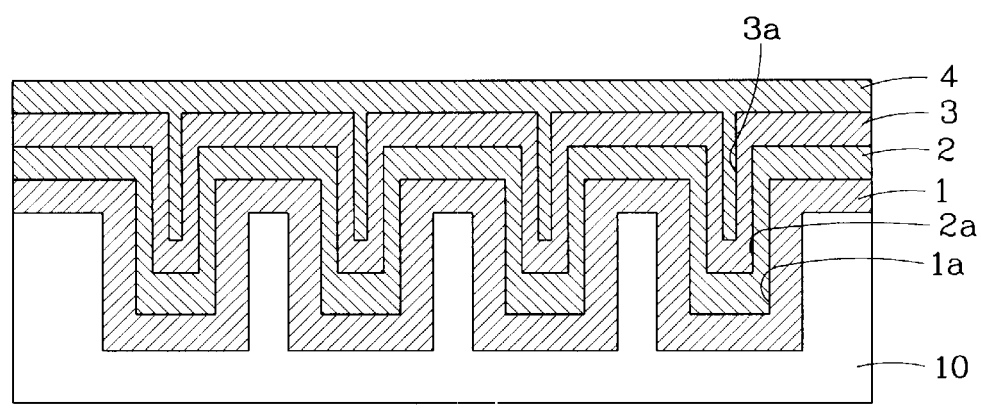
Figure 6F:
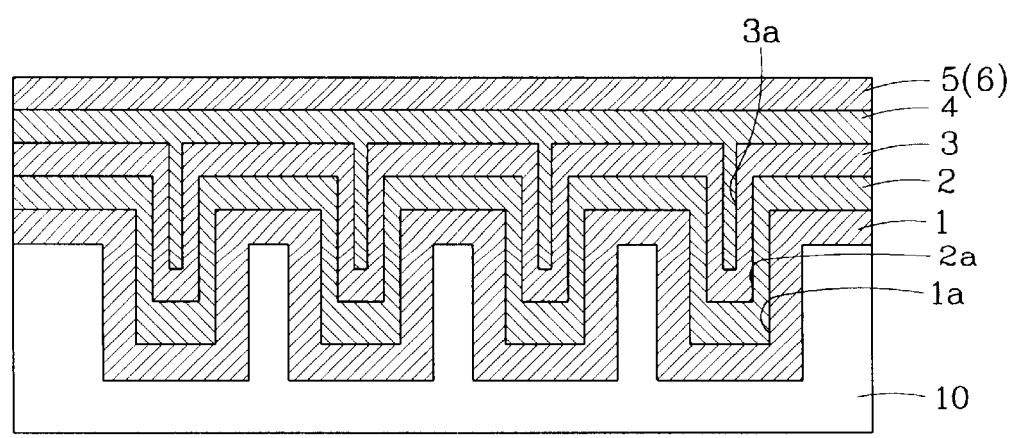
Figure 7A:
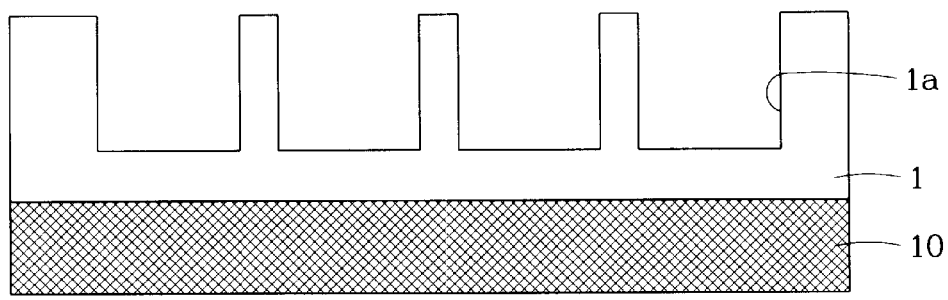
FIGS. 7a to 7e illustrate sequential steps of the fabrication process for the thin film battery having the trench structure in accordance with the present invention, wherein the first collector is deposited on the substrate, and the trenches are formed on the first collector.
Figure 7B:
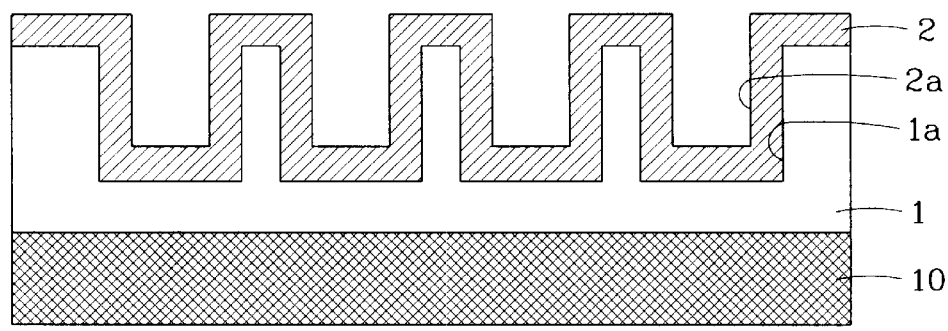
Figure 7C:
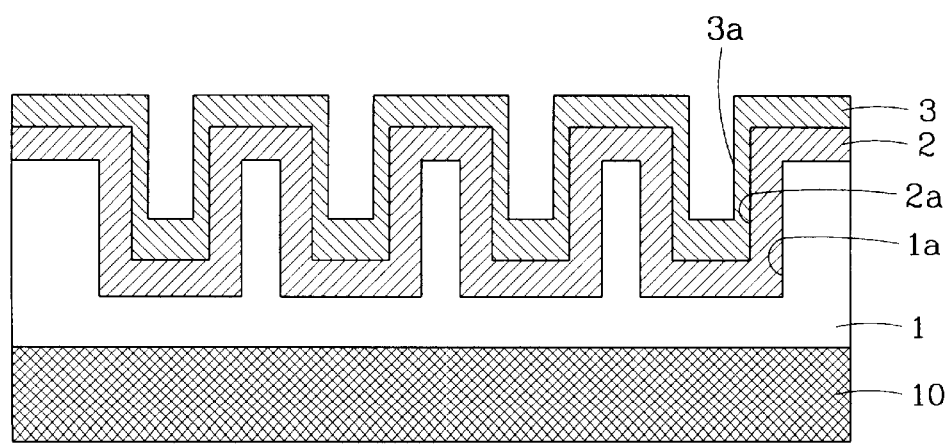
Figure 7D:
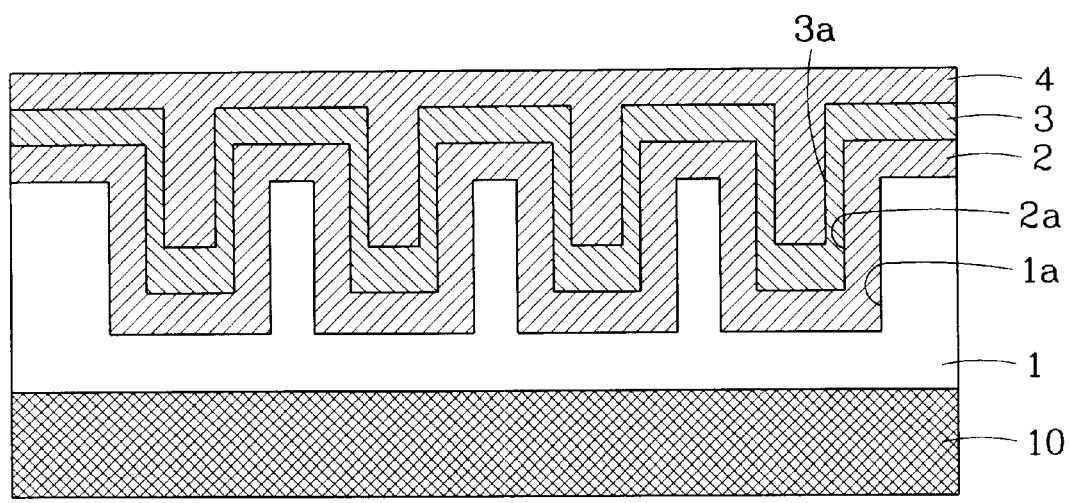
Figure 7E:
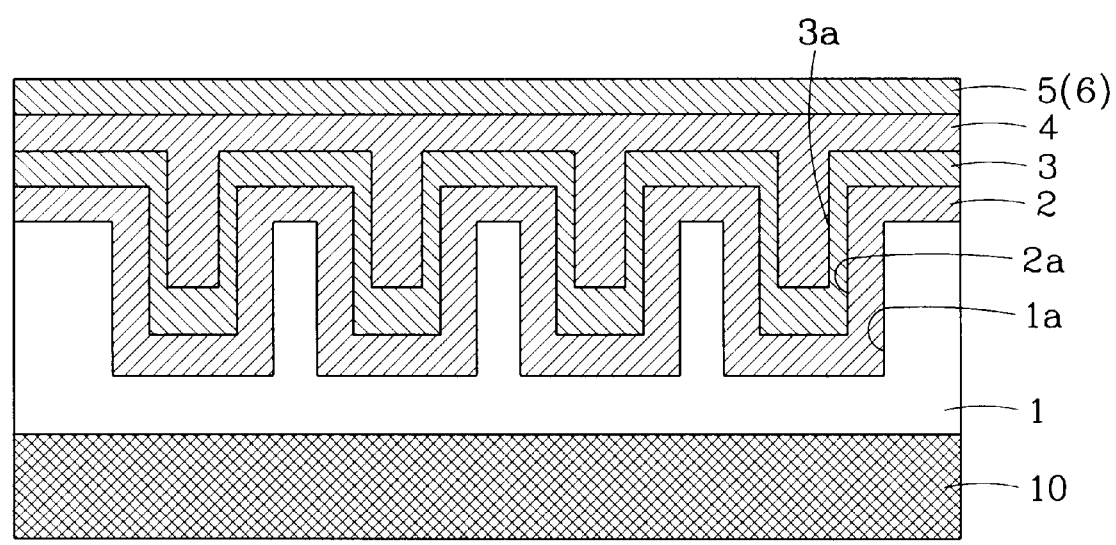

FIGS. 4a, 4b, 5a and 5b show the arrangement of the trenches which can be adaptable to the present invention. FIG. 4a is a plan view illustrating single trenches 10a which are formed on the substrate 10 in one direction, and FIG. 4b is a cross-sectional view taken along line A—A of FIG. 4a. FIG. 5a is a plan view illustrating double trenches 22 which are formed on the substrate 10 in both directions. As compared with the single trenches 10a in FIG. 4a, the double trenches 22 can obtain a wide effective surface area. FIG. 5b is a cross-sectional view taken along line B—B of FIG. 5a, and FIG. 5c is a cross-sectional view taken along line C—C of FIG. 5a. In FIGS. 4a, 4b, 5a and 5b, an interval between the trenches can be freely set.

FIGS. 6a to 6f and 7a to 7e, respectively, illustrate sequential steps of a fabrication process for the thin film battery having the trench structure in accordance with the present invention. FIGS. 6a to 6f are process views in a state where the trenches are provided on the substrate of the battery as shown in FIG. 2. FIGS. 7a to 7e are process views in a state where the trenches are provided on the first collector as shown in FIG. 3. The fabrication process of the battery as shown in FIGS. 6a to 6f will now be described.

a. The trenches 10a are formed on the substrate 10.

b. The first collector 1 is formed.

c. The electrode (cathode 2) is formed.

d. The electrolyte 3 is formed.

e. The electrode (anode 4) is formed.

f. The second collector 6 is formed according to a planarization process after forming the anode 4. Here, the second collector 6 may be directly formed without the planarization process. The encapsulation film process may be carried out before forming the second collector 6. In this case, the anode 4 and the second collector 6 are connected by performing a photolithography process.

Figure 1:
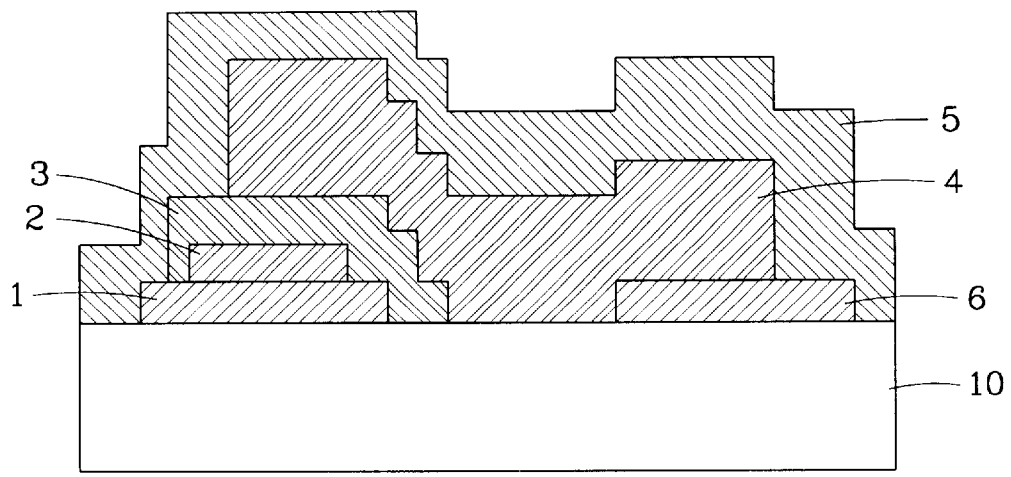
FIG. 1 is a cross-sectional view illustrating a conventional thin film battery.

Differently from the embodiment of FIGS. 6a to 6f, in fabricating the battery having a structure wherein the second collector 6 is positioned between the substrate 10 and the anode 4 (FIG. 1), the electrolyte 3 is formed, and then the second collector 6 is formed.

According to the battery as shown in FIGS. 7a to 7e, the first collector 1 is formed on the substrate 10 of the battery, and the trenches 1a are formed on the collector 1. In this case, a depth of the trench 1 a is limited by a thickness of the first collector 1. The depth of the fabricated trench 1 a cannot be greater than the thickness of the first collector. The succeeding processes are identical to the embodiment of FIGS. 6a to 6f.

Differently from the fabrication processes as shown in FIGS. 6a to 6f and 7a to 7f, the trenches may be formed on the cathode by forming the first collector on the substrate of the battery, forming the cathode on the first collector, and etching the surface of the cathode.

Figure 8:
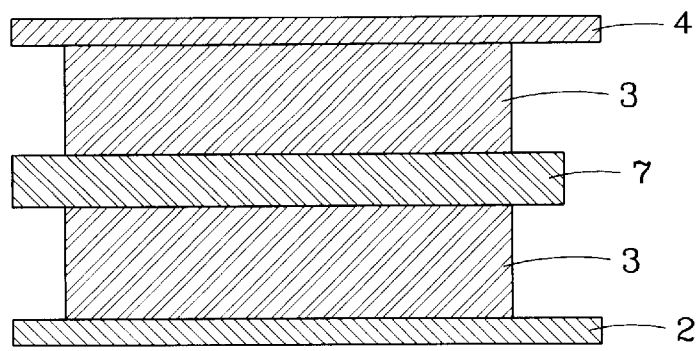
FIG. 8 is a cross-sectional view illustrating a conventional bulk battery.
Figure 9A:
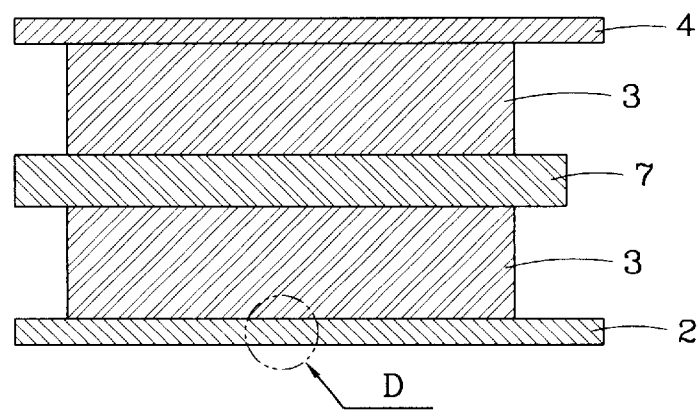
Figure 9B:
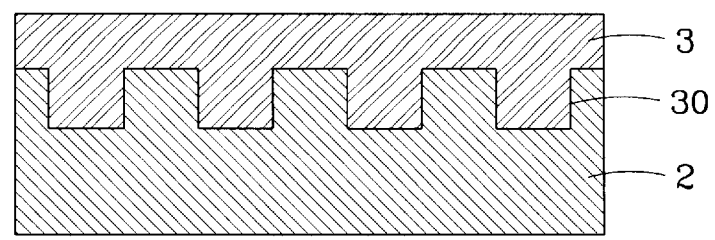

On the other hand, FIGS. 9a and 9b show a state where the trenches in accordance with another embodiment of the present invention adapt to a bulk battery. The bulk battery includes: a substrate (not shown); the first collector (not shown) formed on the substrate; a cathode 2 formed on the first collector, an electrolyte 3 formed on the cathode 2; an isolation film 7 formed on the electrolyte 3; another electrolyte 3 formed on the isolation film 7; an anode 4 formed on the electrolyte 3; and a second collector (not shown) contacted with the anode 4. Here, trenches 30 are formed on the cathode 2. In the bulk battery, the cathode 2 may operate as a collector. FIG. 8 shows the structure of the conventional bulk battery. Here, the contact interface between the cathode 2 and the electrolyte 3 is flat. Conversely, as depicted in FIG. 9b, the trenches 30 are formed on the cathode, and thus the effective surface area and the amount of the cathode 2 are increased, which results in improved performance of the battery.

In the case of the bulk battery, the trench structure may be formed by etching the first collector 1 before forming the cathode 2, identically to the thin film battery, or by etching the cathode 2 itself.

According to the present invention, the trench structure is applicable to the thin film or bulk battery, thereby increasing the amount of the electrode and the contact area between the electrode and the electrolyte per unit battery area. As a result, the low current density and total current storage density which are disadvantages of the conventional thin film battery are improved, and the charging speed after discharge is increased. Consequently, the present invention can provide a high performance battery suitable for electric devices requiring the large consumption power and high current density.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed is:

1. A thin film, solid state battery comprising:
   a substrate having a plurality of trenches formed at its upper portion;
   a first collector formed on the substrate;
   a cathode formed on the first collector;
   an electrolyte formed on the cathode;
   an anode formed on the electrolyte; and
   a second collector contacted to the anode, whereby sequentially stacking thin film elements for an effective contact interface between the cathode and the electrolyte and increasing an amount of the cathode.

2. The thin film battery according to claim 1, further comprising an encapsulation film formed on the anode.

3. A thin film battery comprising:
   a substrate;
   a first collector, formed on the substrate, having a plurality of trenches formed at its upper portion;
   a cathode formed on the first collector;
   an electrolyte formed on the cathode;
   an anode formed on the electrolyte; and
   a second collector contacted to the anode, whereby sequentially stacking thin film elements for an effective contact interface between the cathode and the electrolyte and increasing an amount of the cathode.

4. The thin film battery according to claim 3, further comprising an encapsulation film formed on the anode.

5. A thin film battery comprising:
   a substrate;
   a first collector formed on the substrate;
   a cathode, formed on the first collector, having a plurality of trenches formed at its upper portion;
   an electrolyte formed on the cathode;
   an anode formed on the electrolyte; and
   a second collector contacted to the anode, whereby sequentially stacking thin film elements for an effective contact interface between the cathode and the electrolyte and increasing an amount of the cathode.

6. The thin film battery according to claim 5, further comprising an encapsulation film formed on the anode.

7. A bulk battery comprising:
   a substrate;
   a first collector, formed on the substrate, having a plurality of trenches formed at its upper portion;
   a cathode formed on the first collector;
   a first electrolyte formed on the cathode;
   an isolation film formed on the electrolyte;
   a second electrolyte formed on the isolation film;
   an anode formed on the second electrolyte; and
   a second collector contacted to the anode.

8. A bulk battery comprising:
   a substrate;
   a first collector formed on the substrate;
   a cathode, formed on the first collector, having a plurality of trenches formed at its upper portion;
   a first electrolyte formed on the cathode;
   an isolation film formed on the electrolyte;
   a second electrolyte formed on the isolation film;
   an anode formed on the second electrolyte; and
   a second collector contacted with the anode, said trenches being formed by etching one of the first collector and the cathode.

9. A method of fabricating a battery, comprising:
   forming a plurality of trenches at the upper portion of a substrate;
   forming a first collector on the substrate;
   forming a cathode on the first collector;
   forming an electrolyte on the cathode;
   forming an anode on the electrolyte;
   forming a second collector contacted to the anode; and
   fabricating the battery without the use of a liquid electrolyte.

10. The method according to claim 9, further comprising a step of forming an encapsulation film on the anode.

11. The method according to claim 9, further comprising a step for performing a planarization process after forming the anode.

12. The method according to claim 9, wherein the step for forming the second collector is performed after the step for forming the electrolyte.

13. A method of fabricating a battery, comprising:

forming a first collector on the substrate;

forming a plurality of trenches at the upper portion of the first collector;

forming a cathode on the first collector;

forming an electrolyte on the cathode;

forming an anode on the electrolyte; and forming a second collector contacted to the anode.

14. The method according to claim 13, further comprising a step of forming an encapsulation film on the anode.

15. The method according to claim 13, further comprising a step for performing a planarization process after forming the anode.

16. The method according to claim 13, wherein the step for forming the second collector is performed after the step for forming the electrolyte.

17. A method of fabricating a battery, comprising:

forming a first collector on a substrate;

forming a cathode on the first collector;

forming a plurality of trenches at the upper portion of the cathode;

forming an electrolyte on the cathode;

forming an anode on the electrolyte; and forming a second collector contacted to the anode.

18. The method according to claim 17, further comprising a step of forming an encapsulation film on the anode.

19. The method according to claim 17, further comprising a step for performing a planarization process after forming the anode.

20. The method according to claim 17, wherein the step for forming the second collector is performed after the step for forming the electrolyte.

* * * * *